Patented June 23, 1931

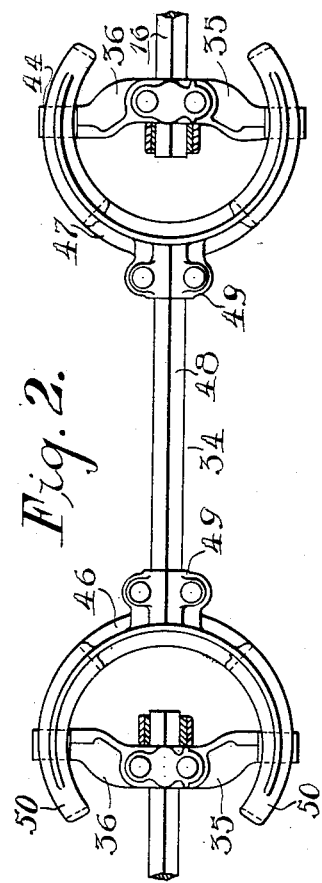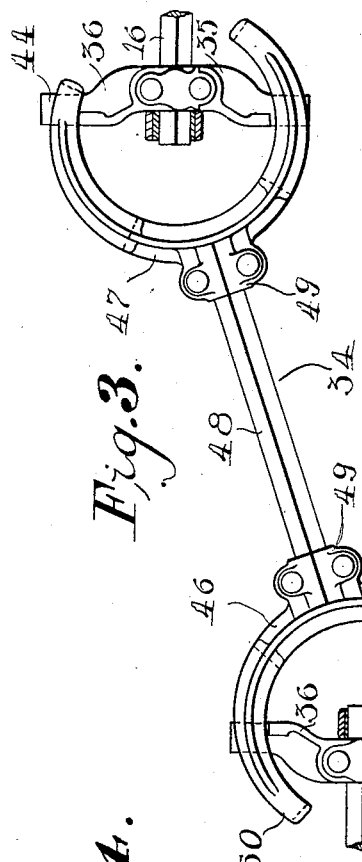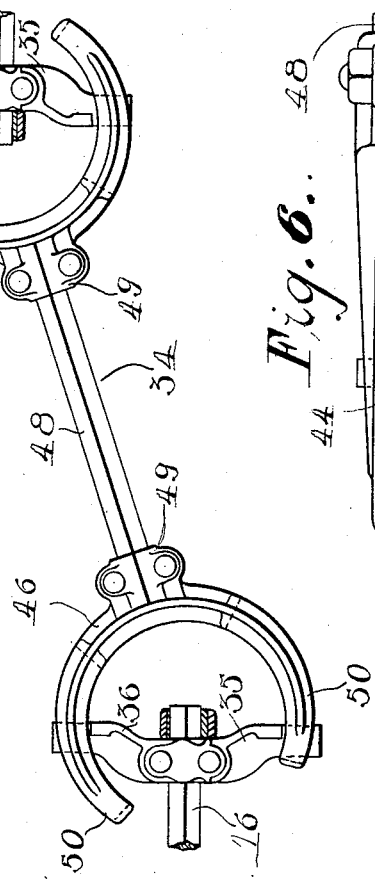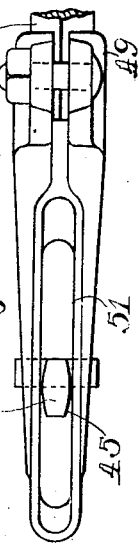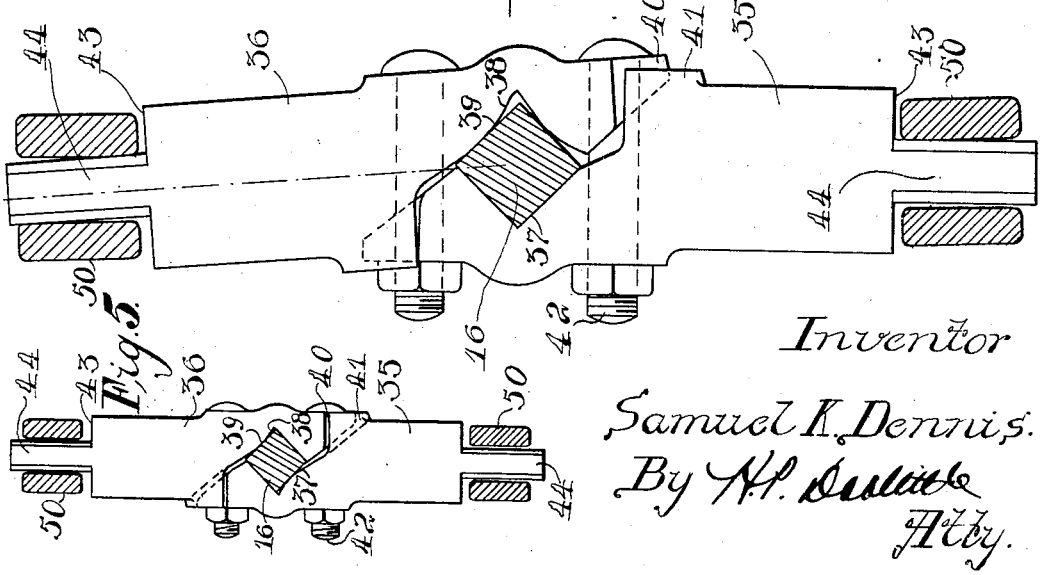

1,811,041

UNITED STATES PATENT OFFICE

SAMUEL K. DENNIS, OF CHICAGO, ILLINOIS, ASSIGNOR TO INTERNATIONAL HARVESTER COMPANY, A CORPORATION OF NEW JERSEY

CHECKROW PLANTER

Application filed August 18, 1926. Serial No. 129,887.

This invention relates to check-row planters and provides a planter comprising flexibly connected planter units capable of accurate check-row planting at high speed.

An object of the invention is to provide a composite planter in which a plurality of two-row planter units in which the seed dropping mechanisms are combined so as to accurately "check" four rows of corn when pulled by a tractor at a speed higher than the customary rate of travel of the standard two-row check-row planter. Another object is to provide a novel form of flexible coupling between the ends of normally aligned shafts journaled on individually movable machines that will permit the shafts to move out of alignment without affecting transmission of movement from one to the other.

To illustrate the invention two sheets of drawings are annexed hereto, the same reference characters being used to designate identical parts in the drawings and in the following specification.

In the drawings:

Fig. 2 is an elevation of the rock shaft coupling mechanism used on the planter;

Fig. 3 is an elevation of the mechanism shown in Fig. 2, indicating the positions assumed by its parts when the planter units are traversing uneven terrain, one planter unit being at a higher level than the others;

Fig. 4 is a detail view showing one of the rock shaft cross-arms comprising part of the above-mentioned coupling mechanism, one of the crank-arms comprising the cross-arm being adjusted to a position out of alinement with the companion crank-arm;

Fig. 5 is an elevation similar to Fig. 4, but showing the parts of the cross-arm in alinement; and Fig. 6 is a plan of one of the slotter arcuate driving heads of the coupling mechanism.

Figure 1:
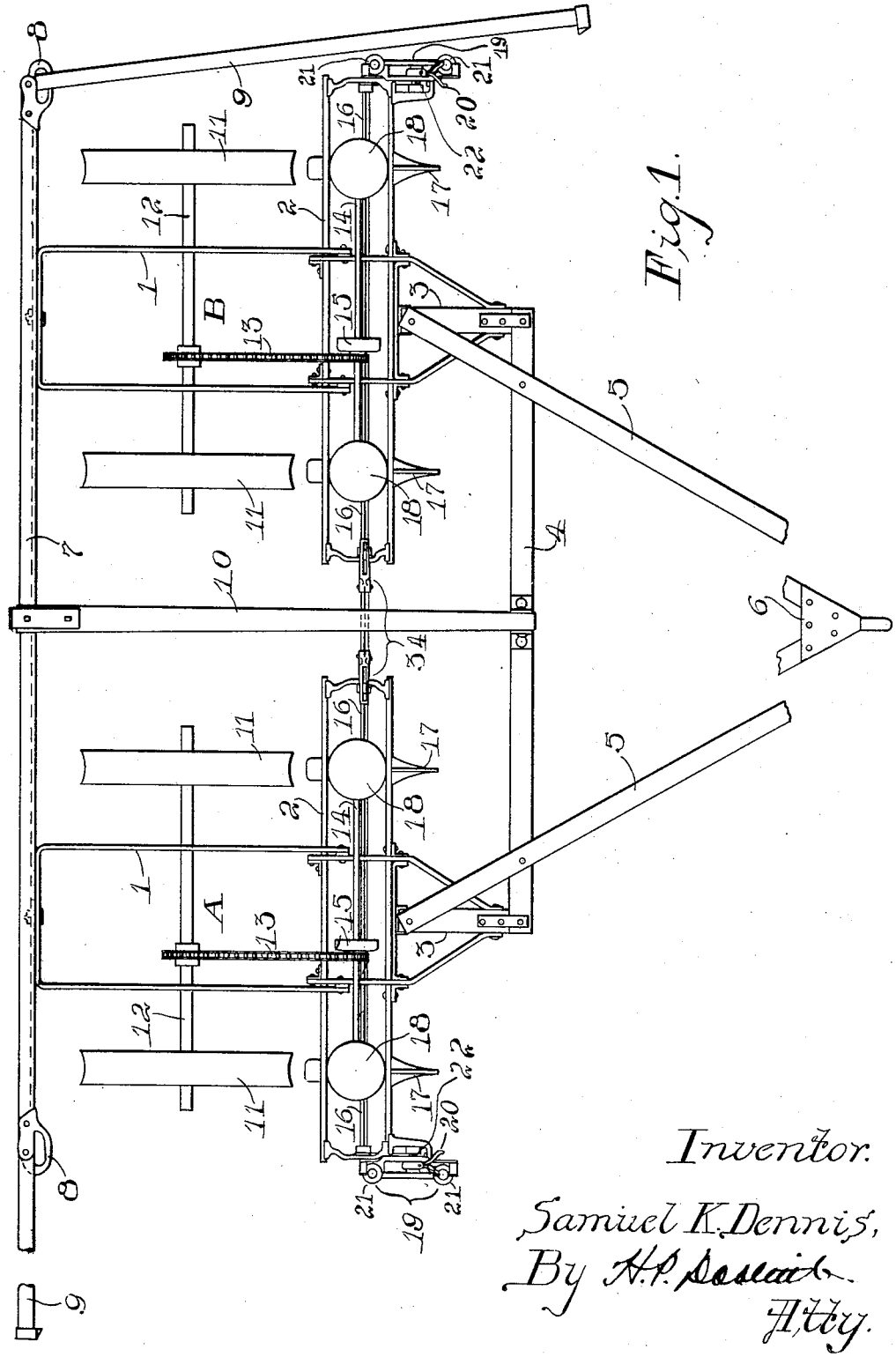
Fig. 1 is a plan view of a planter embodying the invention.

The illustrative embodiment of the invention comprises a plurality of two-row check-row planter units A and B, each having a wheel frame 1 and a runner frame 2. The runner frames have stub-tongues 3 which are connected at their forward ends by the front cross bar 4. The stub-tongues and the cross bar have secured thereto forwardly converging draft bars 5 which are united at their forward ends to form the centrally located draft device 6.

The wheel frames of the planter units are pivotally connected by a rear cross bar 7 having marker cams 8 and co-operating markers 9 secured at its ends. The frame is completed by seat bar 10 secured at its forward end to the front cross bar 4 and supported at its other end by the rear cross bar 7.

Besides the elements above mentioned, each planter unit comprises the supporting wheels 11, the axle 12, the feed shaft drive 13, the feed shaft 14, the intermittent clutch 15, the rock-shaft or check-shaft 16, the furrow openers 17 and the dispensing mechanisms 18. These parts, and their arrangement, are well known to those skilled in the art and no explanation of their operation is thought to be necessary.

At each side of the planter is located a check head 19 connected with the rock shaft so that the latter may be properly actuated by the buttons on the check row wire. These check heads comprise a check fork 20 and check wire guide rollers 21. The check fork is oscillated by the engagement therewith of the buttons upon the check row wire, which, in practice, runs through the fork.

The illustrative planter is essentially a tractor pulled machine, and, as such its speed of travel is ordinarily at least 50% greater than the speed at which two-row horse drawn planters operate.

It is, therefore, necessary that the rock shafts of the respective planter units be accurately coordinated and timed to ensure correct "checking" or deposit of the corn from the planter boots in exact transverse alinement, and for accomplishing this result a special flexible shaft coupling is provided. This is designated as an entirety by the numeral 34 in Fig. 1 of the drawings, and is shown in detail in Figures 2–6 inclusive. It includes cross arms comprising co-operating crank arms 35 and 36 rigidly mounted on the inner ends of the rock-shafts and extending radially therefrom. Each crank arm is formed at its inner end with a notch for enabling the arm to be closely fitted against the rock shaft, the notch for the rock shaft 35 being indicated at 37 and that of the crank-arm 36 at 38. The latter is preferably formed by curved surfaces as shown, in order to permit the radial adjustment of the crank arm 36 from a position of alinement relative to the crank arm 35 as shown in Fig. 5 to such a position as that indicated in Fig. 4.

To accomplish the adjustment of the crank arm 36 from the position shown in Figure 5 to that shown in Figure 4, the arm is rocked upon the curved surface 39 by tightening of the nut on the upper bolt 42 after the nut on the lower bolt has been loosened so as to allow the lower end of the crank arm to move slightly away from the interengaging portions of the crank arm 35. The two crank arms are maintained in alinement with their medial lines in the same plane perpendicular to the axis of the rock shaft 16 by interengaging formations which are herein shown as rounded aligning lugs 40, there being one of each of such lugs on the inner end of each crank arm. Each aligning lug 40 seats closely within a curved socket 41 formed in the companion crank arm.

The particular crank arm structure above set forth allows the rock shaft of the planter units to be correctly coordinated and connected under variable conditions. The condition of the two planters may be such that one rock shaft must be maintained in a rotative position slightly in advance of the other rock shaft. The adjustability of the crank arm 36 will adequately take care of such a condition. Again, slight variations in the manufacture of the elements cooperating with the crank arms may require the companion crank arms to be adjusted to a position similar to that shown in Figure 4.

The outer ends of the crank arms are preferably reduced in cross section to form studs 44, opposite surfaces of these studs being formed along corresponding curves, as indicated at 45 of the drawings. Where the studs 44 join the remainder of the crank arm structures, shoulders 43 are formed so as to act as guides for the driving heads 46 and 47.

The driving heads are formed with sockets to receive the ends of a connecting shaft 48, which is preferably of square cross section. The ends of the shaft 48 are clamped in the sockets in the driving heads 46 and 47 by means of split clamping sections 49. Thus the two driving heads and the connecting shaft 48 constitute a rigid structure for transmitting motion from one rock shaft 16 to the other without substantial lost motion.

In order to insure the correct timing of the rock shafts 16 under all conditions of adjustment of the planter units, the illustrative driving heads 46 and 47 are formed with arcuate arms 50. These arms are slotted, as shown at 51, and the studs 44 of the crank arms 35 and 36 move within these slots so as to permit the entire rock shaft connecting structure to move from the position shown in Figure 2 to that shown in Figure 3 when one planter unit is passing over ground at a higher level than that of the other planter unit. It will be noticed that the points of driving contact between the arcuate driving heads 46 and their coacting crank arms remain at the same distances from the axes of the corresponding rock shaft under all conditions and under the various positions of the rock shafts relative to each other. This operative condition promotes correct timing of the planter unit rock shafts with a minimum of lost motion. It is also to be noted that the above referred points of contact are at substantial distances from the axes of the corresponding rock shafts, which also minimizes the chances of development of lost motion in the driving connection.

Conditions may be such that the driving heads 46 and 47 will have their medial lines in substantially horizontal planes when the two planter units are operating at different levels. In this case it is necessary that the driving heads rock upon the ends of the crank arms 35 and 36, and this action is permitted by the opposite curved surfaces 45 of the studs 44. Preferably also, the slots in the driving heads may be slightly wider than the reduced portions 44 of the crank arms so as to permit of the adjustment illustrated in Figure 4, in which figure one of the slots of a driving head is shown somewhat offset with respect to its companion slot and the axis of the rock shaft 16.

It is to be appreciated that any appreciable amount of lost motion in a connection between the rock shaft 16 will result in inaccurate planting of the corn, by reason of the lagging of the accumulator mechanisms of the one planter with reference to the other. In other words, any substantial amount of lost motion in the flexible shaft coupling 34 will cause the hills of corn to be out of alinement transversely of the field. The illustrative coupling above described has been thoroughly tried out in practice and has shown that its use substantially eliminates inaccuracies of planting due to lost motion or incorrect timing of the rock shafts of the planter units.

While one particular embodiment of the invention has been described for the purpose of clearly setting forth the invention, the invention is to be understood to be not limited to that particular structure, and may be somewhat varied in detail to meet the demands of various applications of the invention. The invention is intended to cover such changes coming within the scope of the appended claims.

Having described my invention, I claim:

1. In a drive coupling; two shafts arranged in alinement in end to end relationship; and a coupling operably connecting said shafts; said coupling including arcuate driving heads having slotted parts, crank arms a pair of which is rigidly secured to each shaft so as to form the cross arm, means for adjustably securing a pair of crank arms on each shaft, means formed on one of said crank arms to permit of its adjustment radially of the shaft, shoulders formed on each crank arm for guiding and supporting said driving heads, and studs formed on said crank arms and extending into the slots of said driving heads.

2. In a drive coupling; two shafts arranged in alignment in end to end relationship; and a coupling operably connecting said shafts; said coupling including arcuate driving heads having slotted parts, crank arms a pair of which is rigidly secured to each shaft so as to form a cross arm, means for adjustably securing the pair of crank arms on each shaft, means formed on one of said crank arms to permit of its adjustment radially of the shaft, guiding means formed on each crank arm for supporting said driving heads, and extensions formed on said crank arms and extending into the slots of said driving heads.

3. In a drive coupling for multiple unit corn planters, two shafts disposed in end to end relation, and a flexible shaft coupling operably connecting the shafts, said coupling comprising a two-part crank arm mounted on each shaft having one part angularly adjustable on the shaft with respect to the other part, and means flexibly connecting the crank arms on adjacent shafts.

4. In a drive coupling for multiple unit corn planters, two shafts disposed in end to end relation, and a coupling operably connecting the shafts, said coupling including two-part cross arms mounted on the inner ends of adjacent shafts, means for angularly adjusting one of said parts with respect to the other in a radial plane, and connecting means slidably engaging the end portions of the cross arms on adjacent shafts.

5. In a drive coupling for multiple unit corn planters, two shafts disposed in end to end relation, and a coupling connecting the adjacent ends of the shafts, said coupling including oppositely facing arcuate members, a bar rigidly connecting said arcuate members in spaced relation, and oppositely extended crank arms mounted on the adjacent ends of each shaft slidably engaging the ends of the arcuate members.

In testimony whereof I affix my signature.

SAMUEL K. DENNIS.